US010036862B2

(12) United States Patent
Katagiyama et al.

(10) Patent No.: US 10,036,862 B2
(45) Date of Patent: Jul. 31, 2018

(54) CONNECTOR

(71) Applicant: Japan Aviation Electronics Industry, Limited, Tokyo (JP)

(72) Inventors: Naoki Katagiyama, Tokyo (JP); Takayuki Tanaka, Tokyo (JP); Hideo Sugimoto, Tokyo (JP); Hideto Shimazu, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 15/724,686

(22) Filed: Oct. 4, 2017

(65) Prior Publication Data
US 2018/0136417 A1    May 17, 2018

(30) Foreign Application Priority Data
Nov. 11, 2016   (JP) ................. 2016-220113

(51) Int. Cl.
G02B 6/38    (2006.01)
G02B 6/42    (2006.01)

(52) U.S. Cl.
CPC .......... *G02B 6/4292* (2013.01); *G02B 6/381* (2013.01); *G02B 6/3869* (2013.01); *G02B 6/3874* (2013.01); *G02B 6/3894* (2013.01)

(58) Field of Classification Search
CPC .... G02B 6/381; G02B 6/3869; G02B 6/3873; G02B 6/3874; G02B 6/3875; G02B 6/3894; G02B 6/4292
USPC .. 385/53, 55, 56, 58, 70, 72, 88, 90–92, 94; 398/135, 139, 200, 201, 212, 214
See application file for complete search history.

(56) References Cited

U.S. PATENT DOCUMENTS

| 7,988,368 | B2 * | 8/2011 | Sakurai | G02B 6/3821 |
| | | | | 385/60 |
| 8,465,311 | B2 | 6/2013 | Takamatsu | |
| 8,708,732 | B2 | 4/2014 | Toda et al. | |
| 9,223,093 | B2 | 12/2015 | Toda et al. | |
| 9,551,841 | B2 * | 1/2017 | Bradley | G02B 6/3807 |
| 9,658,407 | B2 * | 5/2017 | Volker | G02B 6/3874 |
| 9,910,228 | B2 * | 3/2018 | Leigh | G02B 6/3882 |

(Continued)

FOREIGN PATENT DOCUMENTS

| JP | 2010-244056 A | 10/2010 |
| JP | 2012-068323 A | 4/2012 |
| JP | 2013-097878 A | 5/2013 |

(Continued)

*Primary Examiner* — Robert Tavlykaev
(74) *Attorney, Agent, or Firm* — Collard & Roe, P.C.

(57) ABSTRACT

In a connector, a guide member to which an optical connector is fixed is provided with a first guide portion. The optical connector is provided with a second guide portion at a tip portion, in a mating direction, of a holding member thereof. The optical connector has a ferrule with a tip, and the tip is located between the first guide portion and the second guide portion in the mating direction. When the connector is connected to a structural body and before the optical connector reaches an accommodating portion, the first guide portion performs rough positioning of the optical connector with respect to the accommodating portion in a plane perpendicular to the mating direction. When the connector is connected to the structural body, the second guide portion guides the optical connector into the accommodating portion.

12 Claims, 18 Drawing Sheets

(56) References Cited

U.S. PATENT DOCUMENTS

2010/0260456 A1   10/2010  Alcaraz et al.
2017/0269309 A1    9/2017  Koreeda et al.

FOREIGN PATENT DOCUMENTS

| JP | 2013-235193 A | | 11/2013 | |
| JP | 2014-26134 | * | 2/2014 | .............. G02B 6/36 |
| JP | 2016-085422 A | | 5/2016 | |
| JP | 2016-122050 A | | 7/2016 | |
| WO | 2016/103821 A1 | | 6/2016 | |

* cited by examiner

CONNECTOR

CROSS REFERENCE TO RELATED APPLICATIONS

This application is based on and claims priority under 35 U.S.C. § 119 to Japanese Patent Application No. JP2016-220113 filed Nov. 11, 2016, the contents of which are incorporated herein in their entirety by reference.

BACKGROUND OF THE INVENTION

This invention relates to a connector, in particular, to a connector used to connect an optical cable extending from an outside of a structural body to an adapter provided inside the structural body.

A connector of this type is described in JPA 2013-235193 (Patent Document 1). As shown in FIG. 21, the connector 90 described in Patent Document 1 has an optical connector 91, a cylindrical portion 92 and an external cylinder 93. The cylindrical portion 92 covers a periphery of the optical connector 91 at least in part. The external cylinder 93 protects the optical connector 91 and the cylindrical portion 92. The external cylinder 93 is relatively movable with respect to the optical connector 91 and the cylindrical portion 92 in a mating direction (an X-direction).

As understood from FIG. 21, the connector 90 is mated with a receptacle 95 attached to a wall surface (not shown) of a structural body (not shown). The structural body is interiorly provided with a transceiver (an adapter) 96 to be connected to the optical connector 91.

As understood from FIG. 21, when the connector 90 is moved toward the receptacle 95, a front end of the optical connector 91 is first accommodated in an accommodating portion 97 of the transceiver 96. Next, the cylindrical portion 92 is accommodated inside the receptacle 95 in part. After the optical connector 91 is appropriately connected to the transceiver 96, the external cylinder 93 is moved toward the receptacle 95 and rotated around a rotation axis which is along the mating direction. As a result, the external cylinder 93 is fixed to the receptacle 95 by means of a screw action. Thus, the optical connector 91 is connected to the transceiver 96.

SUMMARY OF THE INVENTION

It is desirable that the optical connector is connected to the adapter while checked visually. This is for preventing the front end of the optical connector from being damaged or made dirty by contact or abutment thereof with something. Nevertheless, according to a recent trend, the adapter provided in the structural body tends to be located in a secluded position i.e. a position apart from the wall surface of the structural body. Therefore, it becomes hard to visually check connecting the optical connector to the adapter.

It is an object of the present invention to provide a connector which has an optical connector and which enables the optical connector to be accurately connected to an adapter without a visual check.

One aspect of the present invention provides a connector which is connectable to a structural body provided with an adapter. The adapter has an accommodating portion and a sleeve located in the accommodating portion. The connector comprises an optical connector and a guide member. The optical connector is fixed to the guide member. The optical connector is accommodated in the accommodating portion at least in part when the connector is connected to the structural body. The guide member is provided with a first guide portion and a receiving portion. The receiving portion receives the adapter at least in part when the connector is connected to the structural body. The optical connector comprises a ferrule and a holding member which holds the ferrule movably along a mating direction. The holding member is provided with a second guide portion at a tip portion thereof in the mating direction. The second guide portion has a surface intersecting with the mating direction. The ferrule protrudes from the holding member in the mating direction. The ferrule has a tip which is located between the first guide portion and the second guide portion in the mating direction. When the connector is connected to the structural body and before the optical connector reaches the accommodating portion, the first guide portion performs rough positioning of the optical connector with respect to the accommodating portion in a plane perpendicular to the mating direction. When the connector is connected to the structural body, the second guide portion guides the optical connector into the accommodating portion. When the connector is connected to the structural body, the tip of the ferrule is received by the sleeve.

When the connector is connected to the structural body and before the optical connector reaches the accommodating portion of the adapter, the first guide portion of the connector performs rough positioning of the optical connector with respect to the accommodating portion in the plane perpendicular to the mating direction. In addition, when the connector is connected to the structural body, the second guide portion of the connector guides the optical connector into the accommodating portion of the adapter. As a result, when the connector is connected to the structural body, the tip of the ferrule of the optical connector is received by the sleeve located inside the accommodating portion of the adapter. Thus, in the connector of the present invention, the optical connector can be accurately connected to the adapter without a visual check.

An appreciation of the objectives of the present invention and a more complete understanding of its structure may be had by studying the following description of the preferred embodiment and by referring to the accompanying drawings.

Figure 9:
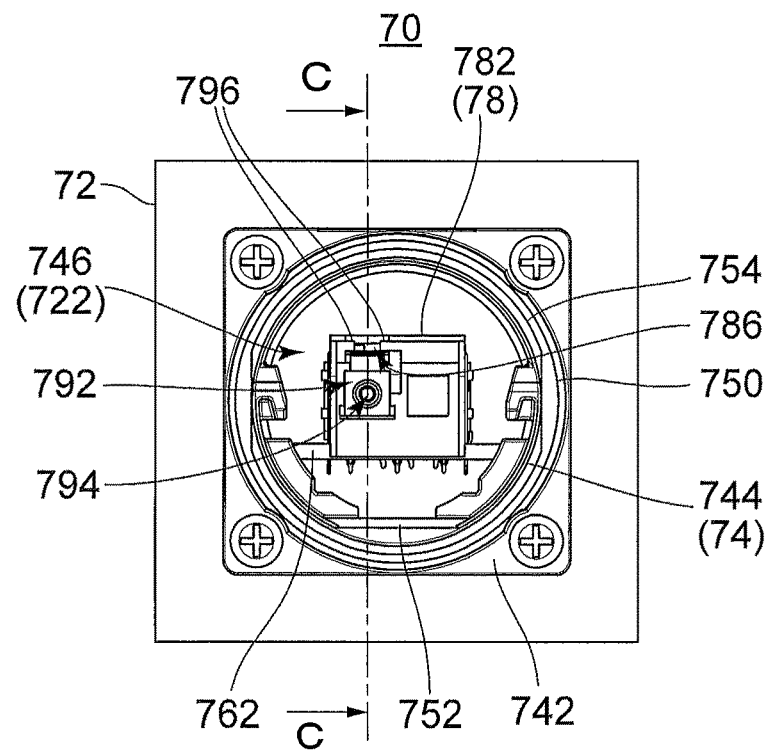
FIG. 9 is a rear view showing the part of the structural body of FIG. 8.
Figure 10:
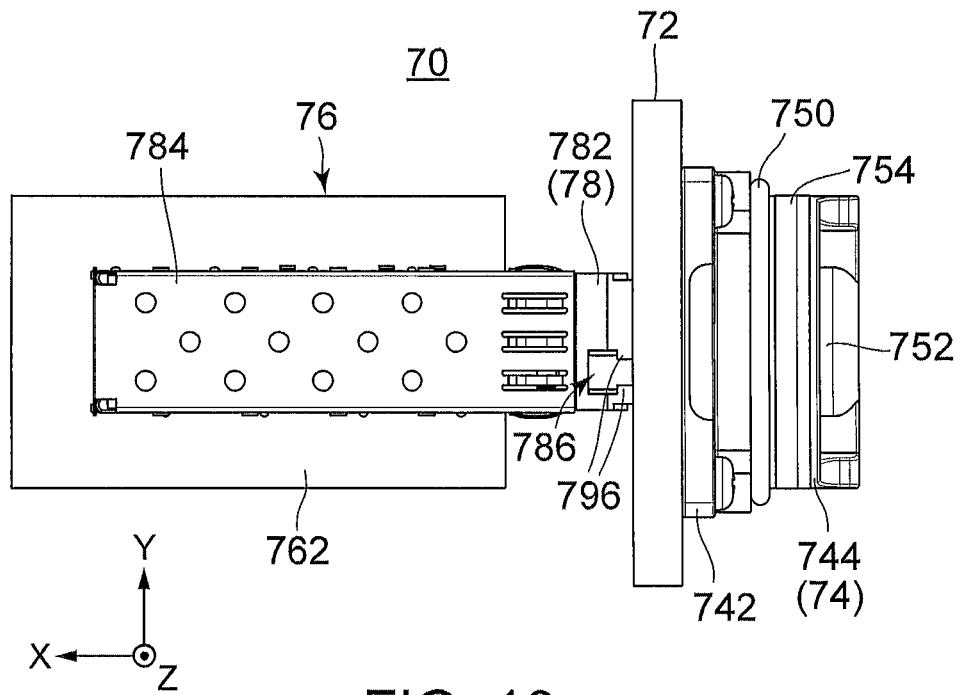
FIG. 10 is a plan view showing the part of the structural body of FIG. 8.
Figure 11:
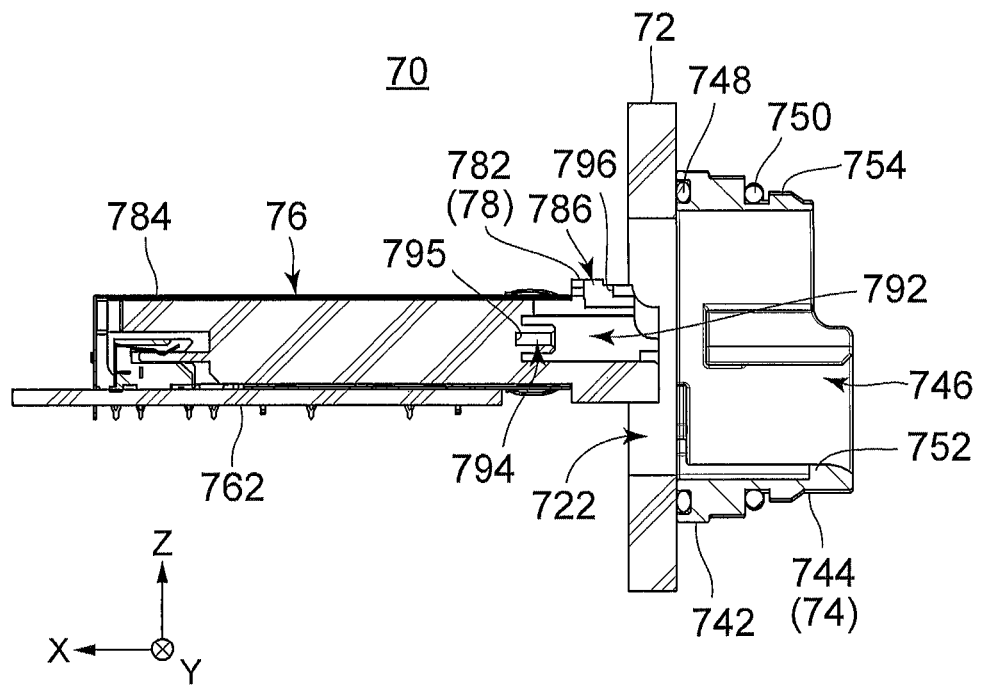
FIG. 11 is a longitudinal cross-sectional view showing the part of the structural body of FIG. 9, taken along line C-C. An inner circuit of a small form-factor pluggable (SFP) module is omitted in the figure.

The connector has a cross section corresponding to line C-C of FIG. 9. A main locked portion is not yet locked by a main locking portion.

Figure 17:
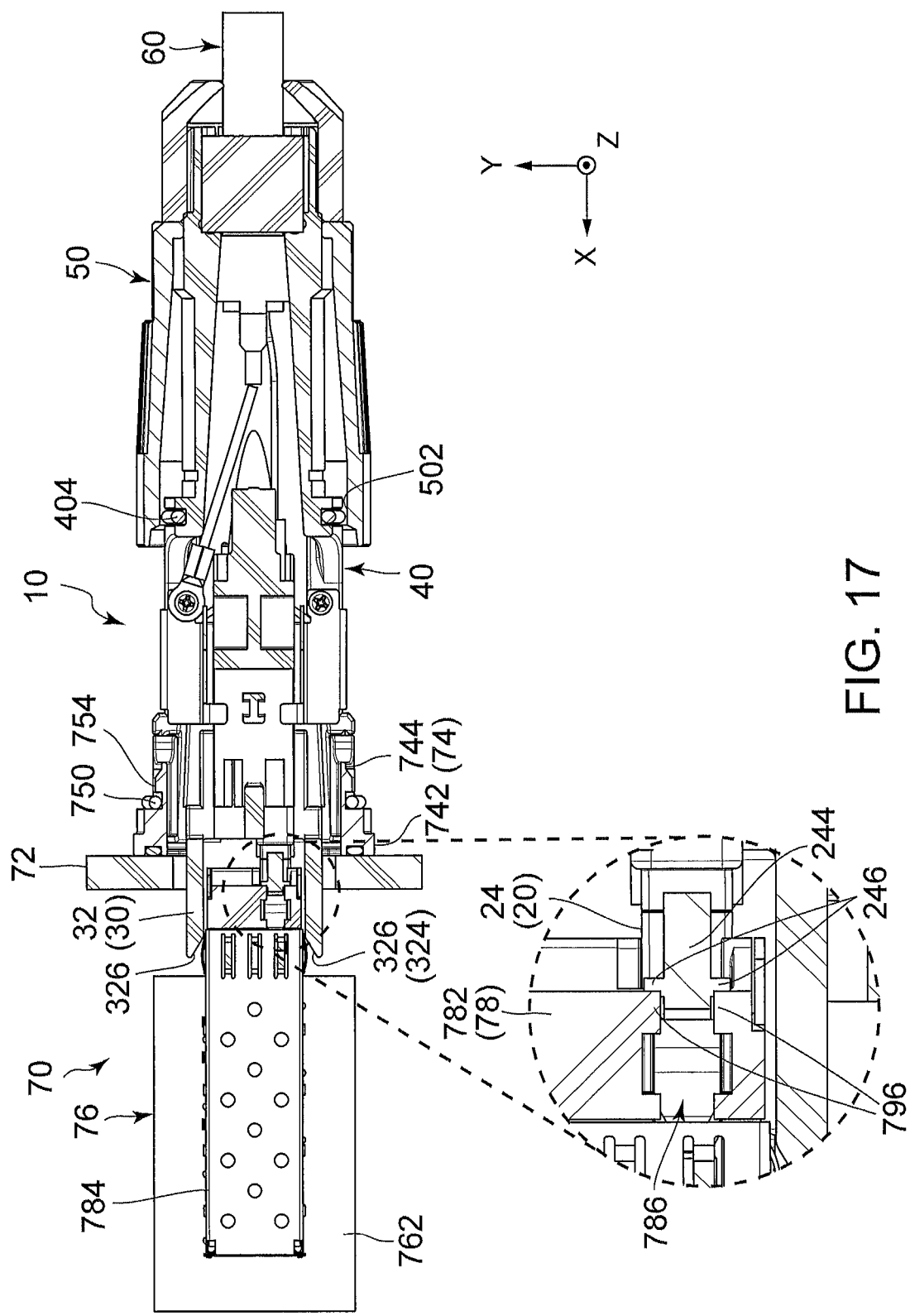
FIG. 17 is a transverse cross-sectional view for describing the step of FIG. 16.
Figure 18:
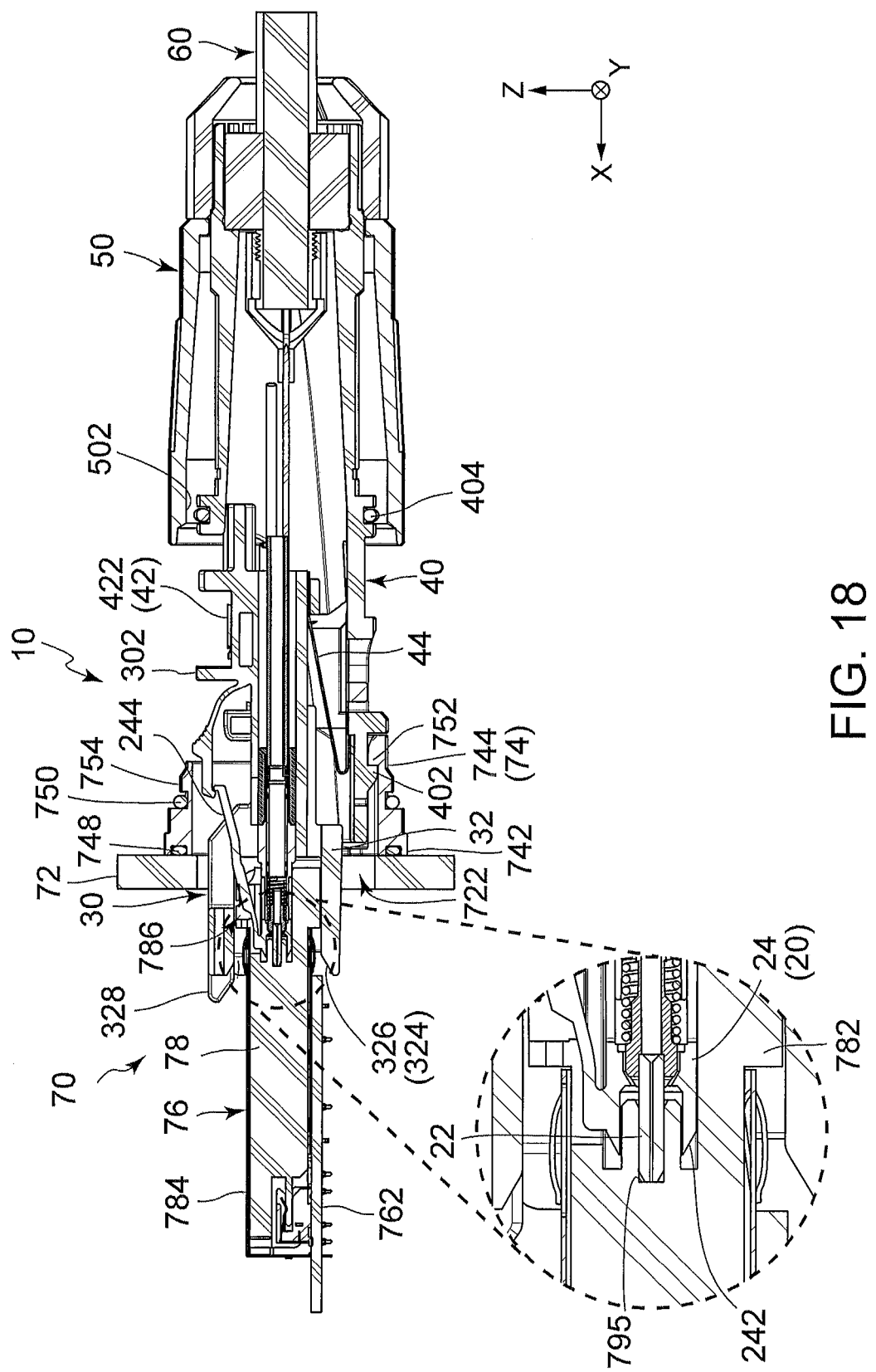

FIG. 18 is a longitudinal cross-sectional view for describing a step succeeding the step of FIG. 17. The tip of the ferrule reaches a front wall (or an optical receiving portion) of the sleeve.

Figure 19:
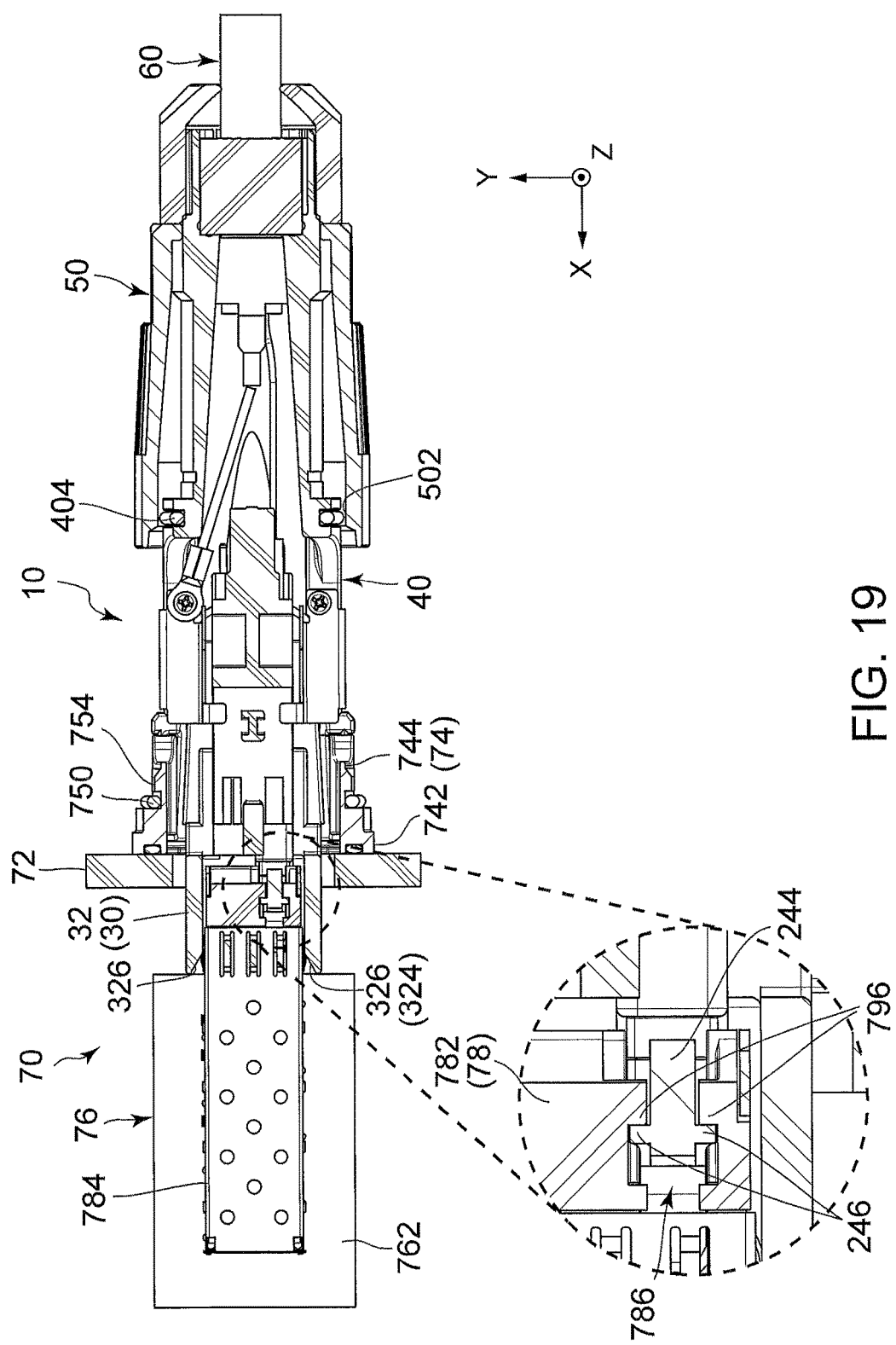

FIG. 19 is a transverse cross-sectional view for describing the step of FIG. 18, The cross section of the connector corresponds to line C-C of FIG. 9. The main locked portion is locked by the main locking portion.

Figure 20:
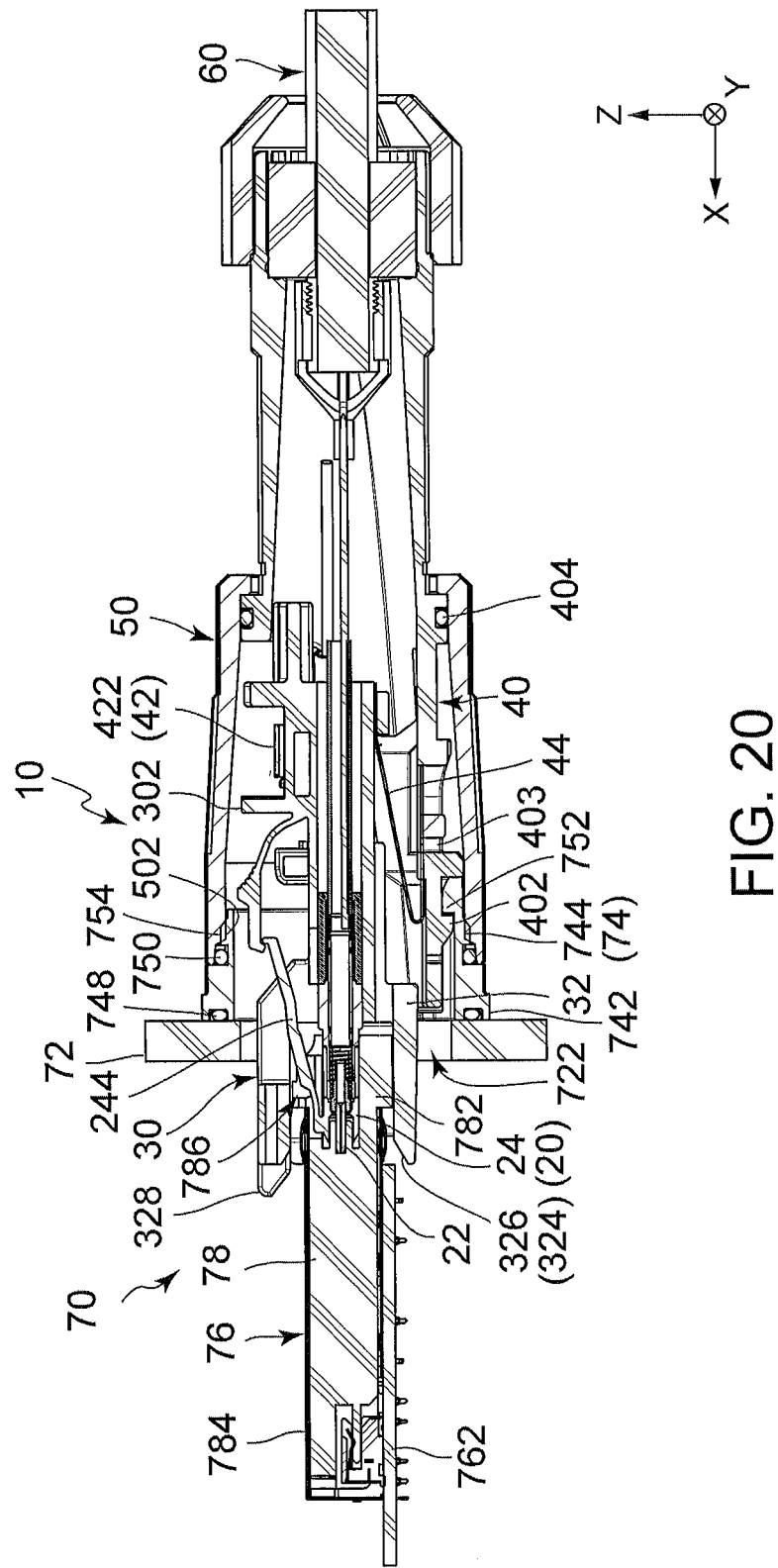

FIG. 20 is a longitudinal cross-sectional view for describing a step succeeding the step of FIG. 18.

Figure 21:
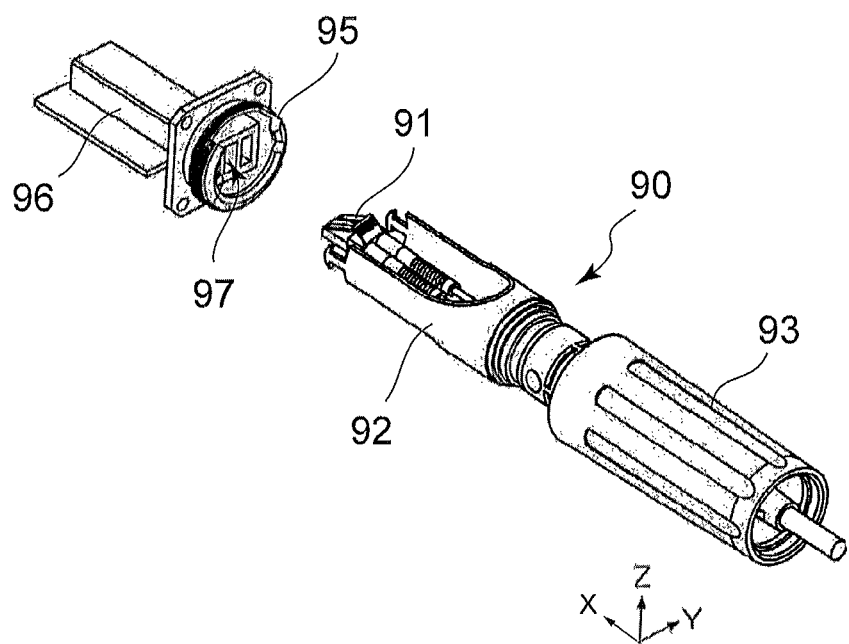

FIG. 21 is perspective view showing a connector, a receptacle and a transceiver which are described in Patent Document 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

As understood from FIGS. 12 to 20, a connector 10 according to an embodiment of the present invention is a connector which is connectable to a structural body 70. The connector 10 is also removable from the structural body 70.

Referring to FIGS. 8 to 11, the structural body 70 is provided with a panel 72, a receptacle 74 and an adapter unit 76.

As shown in FIGS. 8 to 11, the panel 72 is a plate-like member forming a part of a casing (not shown) of the structural body 70. The panel 72 has a pair of main surfaces perpendicular to a front-rear direction or a mating direction. The panel 72 is formed with an aperture 722 which penetrates the pair of the main surfaces in the front-rear direction. In the present invention, the front-rear direction is an X-direction. A positive X-direction is directed forward while a negative X-direction is directed rearward.

As shown in FIGS. 8 to 11, the receptacle 74 has a flange portion 742 of a square shape and a cylindrical portion 744 of a cylindrical shape. The cylindrical portion 744 has a lower-rear end and an upper-rear end. The lower-rear end protrudes rearward beyond the upper-rear end. It should be noted that an up-down direction is a Z-direction in the present embodiment. A positive Z-direction is directed upward while a negative Z-direction is directed downward. The flange portion 742 and the cylindrical portion 744 are formed with a hollow portion 746 which penetrates them continuously. Moreover, the flange portion 742 and the cylindrical portion 744 are attached with waterproofing members 748 and 750, respectively. The receptacle 74 also has a preliminary locking portion 752 and a male screw portion (screw) 754. In the present embodiment, the preliminary locking portion 752 is a protrusion protruding upward. The male screw portion 754 is formed in an outer peripheral surface of the cylindrical portion 744. The receptacle 74 is screwed on one of the main surfaces of the panel 72 so that the hollow portion 746 and the aperture 722 of the panel 72 communicate with each other. Thus, the receptacle 74 is located outside the casing (not shown) of the structural body 70. The waterproofing member 748 is sandwiched between the receptacle 74 and the panel 72. When the connector 10 is connected to the structural body 70, the hollow portion 746 receives the connector 10 in part. At this time, the preliminary locking portion 752 locks a preliminary locked portion 402 described later. The male screw portion 754 corresponds to a female screw portion 502 (see FIG. 6) of a coupling nut 50 described later. The male screw portion 754 is used to fix the coupling nut 50 to the receptacle 74 by means of a screw action. When the coupling nut 50 is fixed to the receptacle 74, the waterproofing member 750 is sandwiched between the coupling nut 50 and the receptacle 74 as seen in FIG. 20.

As shown in FIGS. 8 to 11, the adapter unit 76 is provided with a circuit board 762 and an adapter 78 mounted on the circuit board 762. The adapter unit 76 is placed inside the structural body 70. The adapter 78 is located inside the aperture 722 in part. The adapter 78 is apart from both of the panel 72 and the receptacle 74. The adapter 78 is fixed to the casing of the structural body 70 via the circuit board 762 and another non-illustrated member or a fixing member. Accordingly, relative positioning accuracy of the adapter 78 with respect to the aperture 722 depends on product accuracy and attaching accuracy of the circuit board 762 and the fixing member (not shown). In the present embodiment, the adapter 78 is composed of a small form-factor pluggable (SFP) module 782 and an SFP cage 784 which are correspond to a local connector (LC). The SFP cage 784 is fixed to the circuit board 762. On the other hand, the SFP module 782 is formed to be attachable to and detachable from the circuit board 762 and the SFP cage 784. The SFP module 782 has an accommodating portion 792 and a sleeve 794 located inside the accommodating portion 792. The sleeve 794 has a front wall 795. The front wall 795 is provided with an optical receiving portion (not shown). In addition, the SFP module 782 is provided with an inner circuit (not shown) to transform an optical signal incident on the optical receiving portion into an electrical signal. The inner circuit includes a signal processing circuit (not shown) with a photoelectric transfer element. The SFP module 782 is further provided with main locking portions 796. The main locking portions 796 are protrusions protruding inward in a lateral direction in a recessed portion 786 of the SFP module 782. In the present embodiment, the lateral direction is a Y-direction. The accommodating portion 792 accommodates an optical connector 20 (see FIG. 6) described later at least in part when the connector 10 is connected to the structural body 70. The sleeve 794 receives a tip of a ferrule 22 (see FIG. 6) described later when the connector 10 is connected to the structural body 70. In the present embodiment, the adapter 78 is composed of the SFP module 782 and the SFP cage 784 as mentioned above. However, the present invention is not limited thereto. The adapter 78 may be a device other than the SFP module 782, for example, a fiber optic adapter or a coupler. Even in such a case, the adapter 78 also has the accommodating portion 792 and the sleeve 794 which is located in the accommodating portion 792. For instance, the fiber optic adapter has a pair of the accommodating portions 792 and a pair of the sleeves 794. The accommodating portions 792 of the pair are directed in opposite directions. The sleeves 794 of the pair are located in the accommodating portions 792 of the pair, respectively. The sleeves 794 of the pair are contiguous to each other. When two of the connectors 10 are connected to the fiber optic adapter, the tips of the ferrules 22 (see FIG. 6) of the connectors 10 are brought in to abutment with each other inside the sleeves 794 contiguous with each other. In the present embodiment, the SFP module 782 has a standard shape. However, there is a case where the sleeve 794 in the SFP module 782 is slightly different in position in a direction perpendicular to the front-rear direction according to a production company producing the connector or a model number of the connector.

Referring to FIGS. 1 to 7, the connector 10 is provided with the optical connector 20, a guide member 30, a barrel 40 and the coupling nut 50. The connector 10 is attached to an end portion of an optical cable 60 and used.

Figure 2:
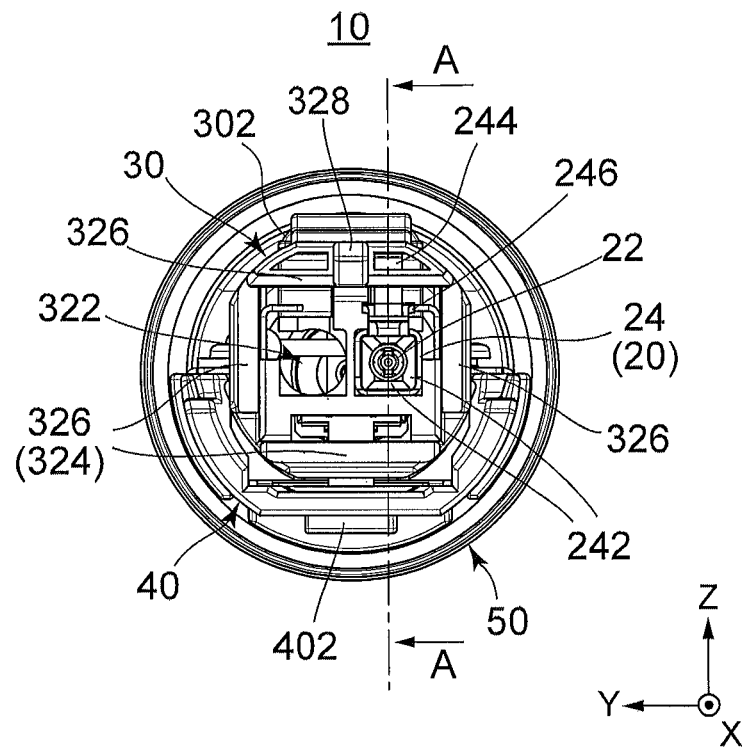
FIG. 2 is a front view showing the connector of FIG. 1.
Figure 3:
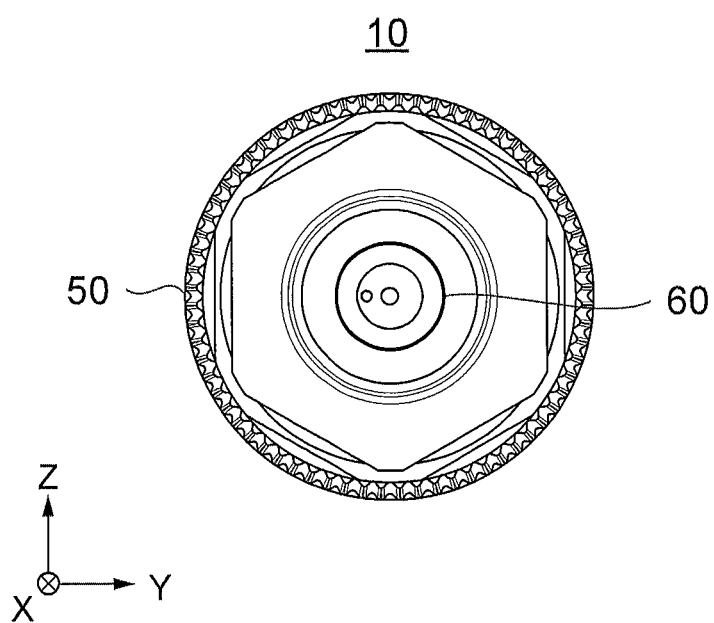
FIG. 3 is a rear view showing the connector of FIG. 1.
Figure 6:
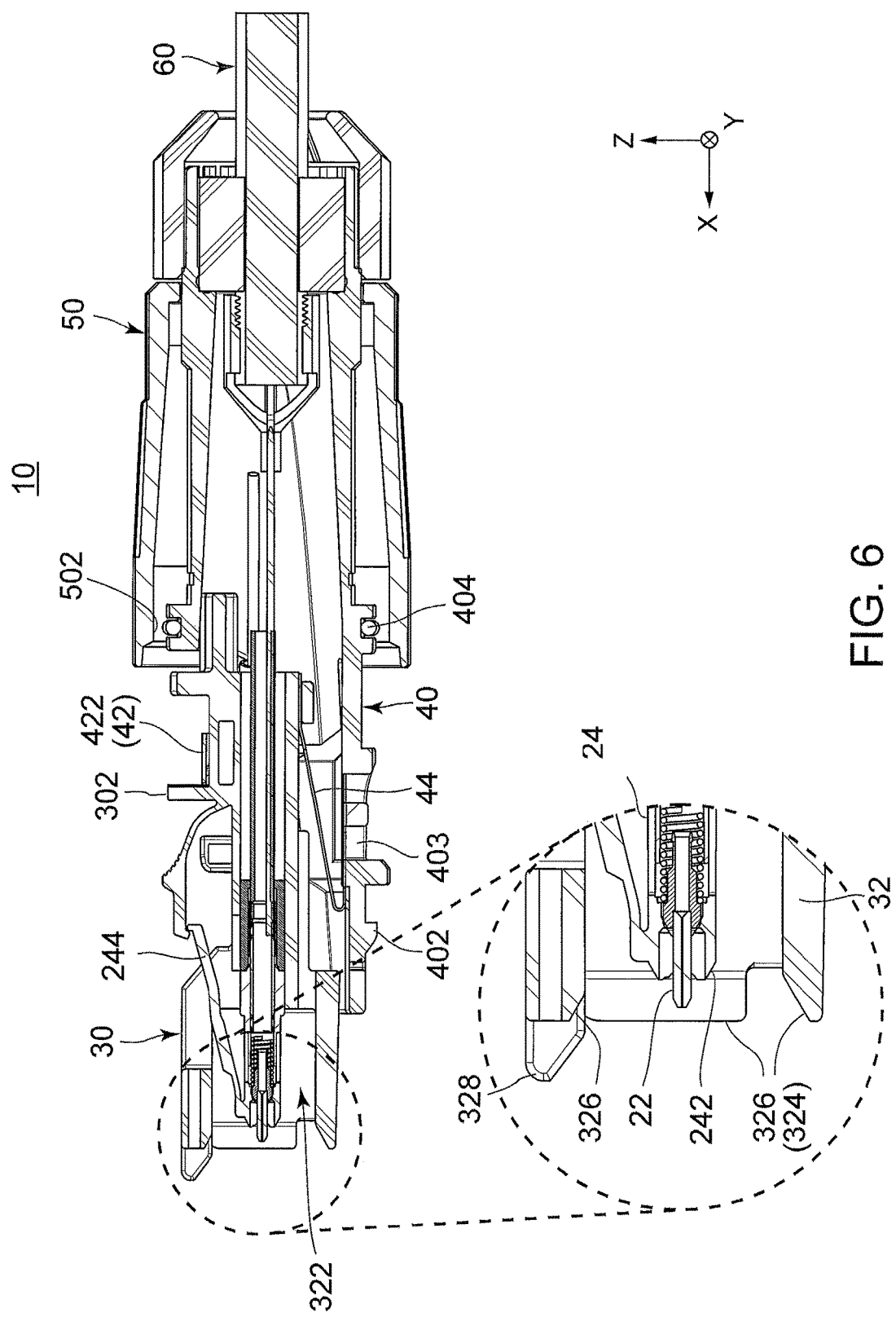
FIG. 6 is a longitudinal cross-sectional view showing the connector of FIG. 2, taken along line A-A.
Figure 7:
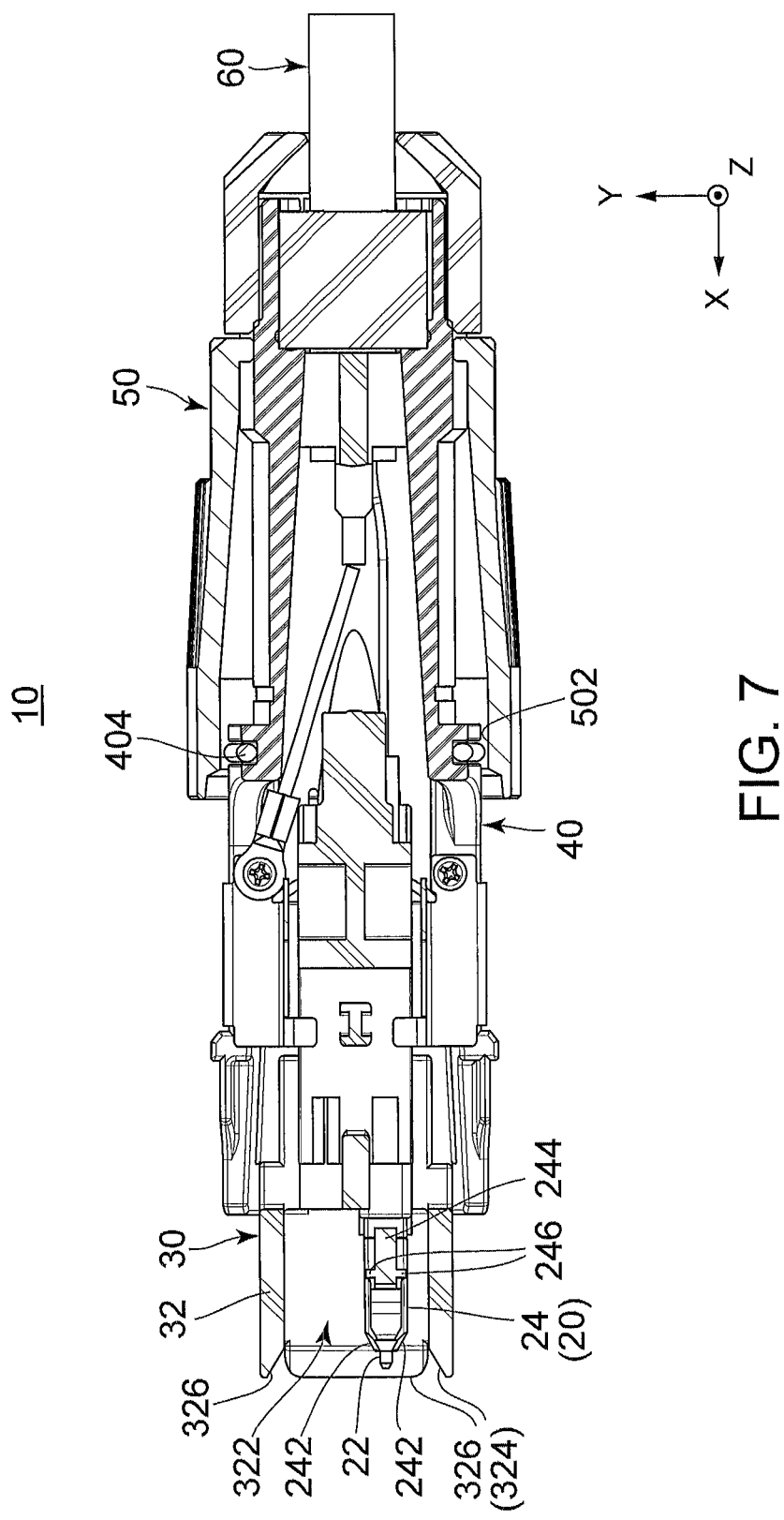
FIG. 7 is a transverse cross-sectional view showing the connector of FIG. 1, taken along line B-B.
Figure 8:
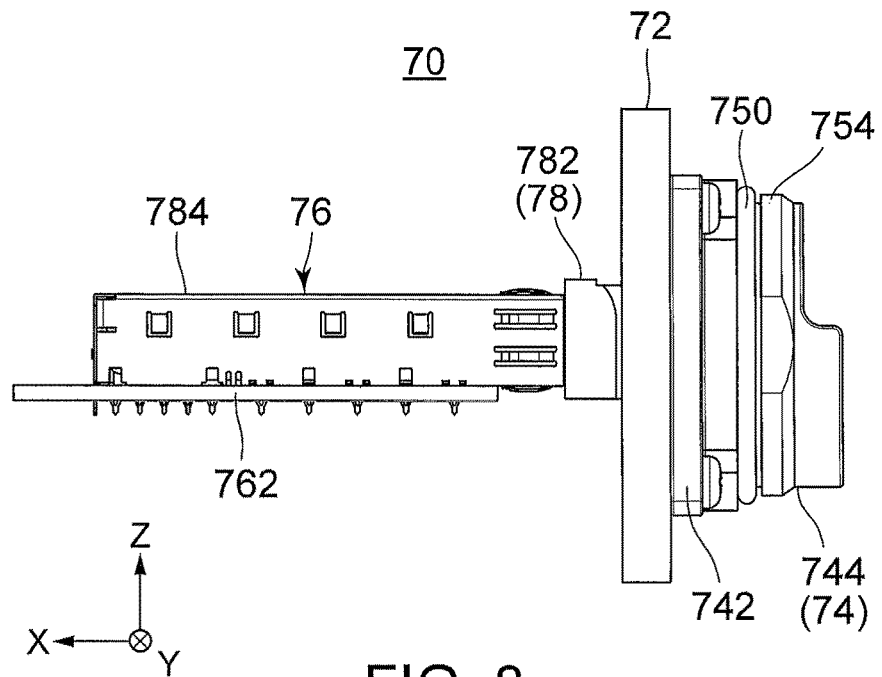
FIG. 8 is a side view showing a part of a structural body to which the connector of FIG. 1 is connected. A reinforcement plate is omitted in the figure.

As shown in FIGS. 2, 6 and 7, the optical connector 20 has the ferrule 22 and a holding member 24. The holding member 24 holds the ferrule 22 movably in the front-rear direction (the mating direction). The ferrule 22 is fixed to an end portion of an optical fiber (not shown) extending from the optical cable 60. As shown in FIGS. 6 and 7, the ferrule 22 protrudes forward from the holding member 24 in the front-rear direction. The holding member 24 is provided with a guide portion (a second guide portion) 242 at a tip portion thereof in the front-rear direction. The guide portion 242 has surfaces intersecting with the front-rear direction. The holding member 24 also has a detaching lever 244. As shown in FIG. 7, the detaching lever 244 is provided with main locked portions 246. In the present embodiment, the main locked portions 246 are protrusions which protrude outward from the detaching lever 244 in the lateral direction. The main locked portions 246 are movable at least in the up-down direction due to resilient deformation of the detaching lever 244. The main locked portions 246 are locked by the main locking portions 796 as described later when the tip of the ferrule 22 is received by the sleeve 794 of the adapter 78 (see FIG. 11) and brought into contact with the front wall (the optical receiving portion) 795. In the present embodiment, the optical connector 20 is a local connector (an LC). However, the present invention is not limited thereto. The optical connector 20 may be another type connector. Moreover, in the present embodiment, the optical connector 20 is one in number. However, the connector 10 may be provided with two or more of the optical connectors 20.

As understood from FIGS. 2, 6 and 7, the guide member 30 is attached to the optical connector 20. In other words, the optical connector 20 is fixed to the guide member 30. As understood from FIGS. 1, 2, and 4 to 7, the guide member 30 has a guide wall 32 which surrounds a periphery of the optical connector 20 in a plane perpendicular to the front-rear direction. As shown in FIGS. 2, 6 and 7, inside the guide wall 32, a receiving portion 322 is provided. The receiving portion 322 receives the adapter 78 at least in part when the connector 10 is connected to the structural body 70. As shown in FIGS. 1, 2, and 4 to 7, the guide wall 32 has a guide portion (a first guide portion) 324 with surfaces intersecting with the front-rear direction. As understood from FIGS. 6 and 7, the first guide portion 324 is a part of the guide wall 32 that is located forward thereof in the front-rear direction. The first guide portion 324 has a main guide portion 326 located relatively rearward in the front-rear direction and a guide protruding portion 328 protruding forward from the main guide portion 326. The main guide portion 326 protrudes forward beyond the tip of the ferrule 22 in the front-rear direction. The tip of the ferrule 22 is located between the first guide portion 324 (a front end of the main guide portion 326) and second guide portion 242 in the front-rear direction. The guide protruding portion 328 protrudes forward beyond the main guide portion 326 in the front-rear direction. This arrangement is intended to correspond to another arrangement where the upper rear end of the receptacle 74 is located forward beyond the lower rear end of the receptacle 74. In the present embodiment, the first guide portion 324 surrounds the substantially whole circumference of a tip portion of the optical connector 20 in a plane perpendicular to the front-rear direction. However, the present invention is not limited thereto. The first guide portion 324 may not surround the circumference of the optical connector 20. For example, the first guide portion 324 may be merely provided above or under the optical connector 20 or above and under the optical connector 20 in the plane perpendicular to the front-rear direction. However, it is preferable that the first guide portion 324 surrounds the tip portion of the optical connector 20 from three or more directions in the plane perpendicular to the front-rear direction in order to protect the tip portion of the optical connector 20. It is more preferable that the first guide portion 324 surrounds the tip portion of the optical connector 20 from four or whole directions in the plane perpendicular to the front-rear direction.

Figure 1:
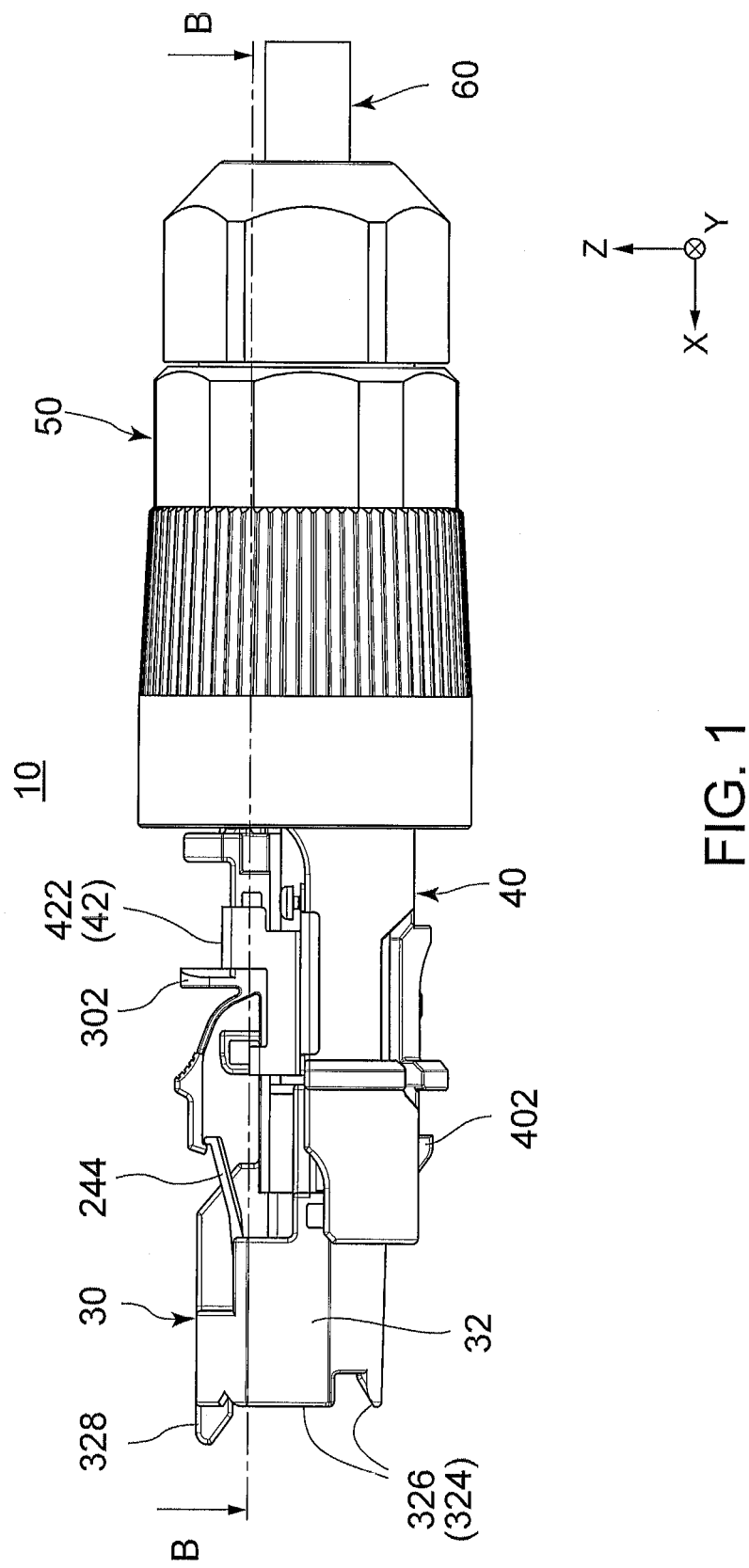
FIG. 1 is a side view showing a connector according to an embodiment of the present invention.

As shown in FIGS. 1 and 6, the guide member 30 also has a protruding portion 302 protruding in a direction intersecting with the front-rear direction. In the present embodiment, the protruding portion 302 protrudes upward in the up-down direction. The protruding portion 302 is used as an operation portion to move the guide member 30 along the front-rear direction.

Figure 4:
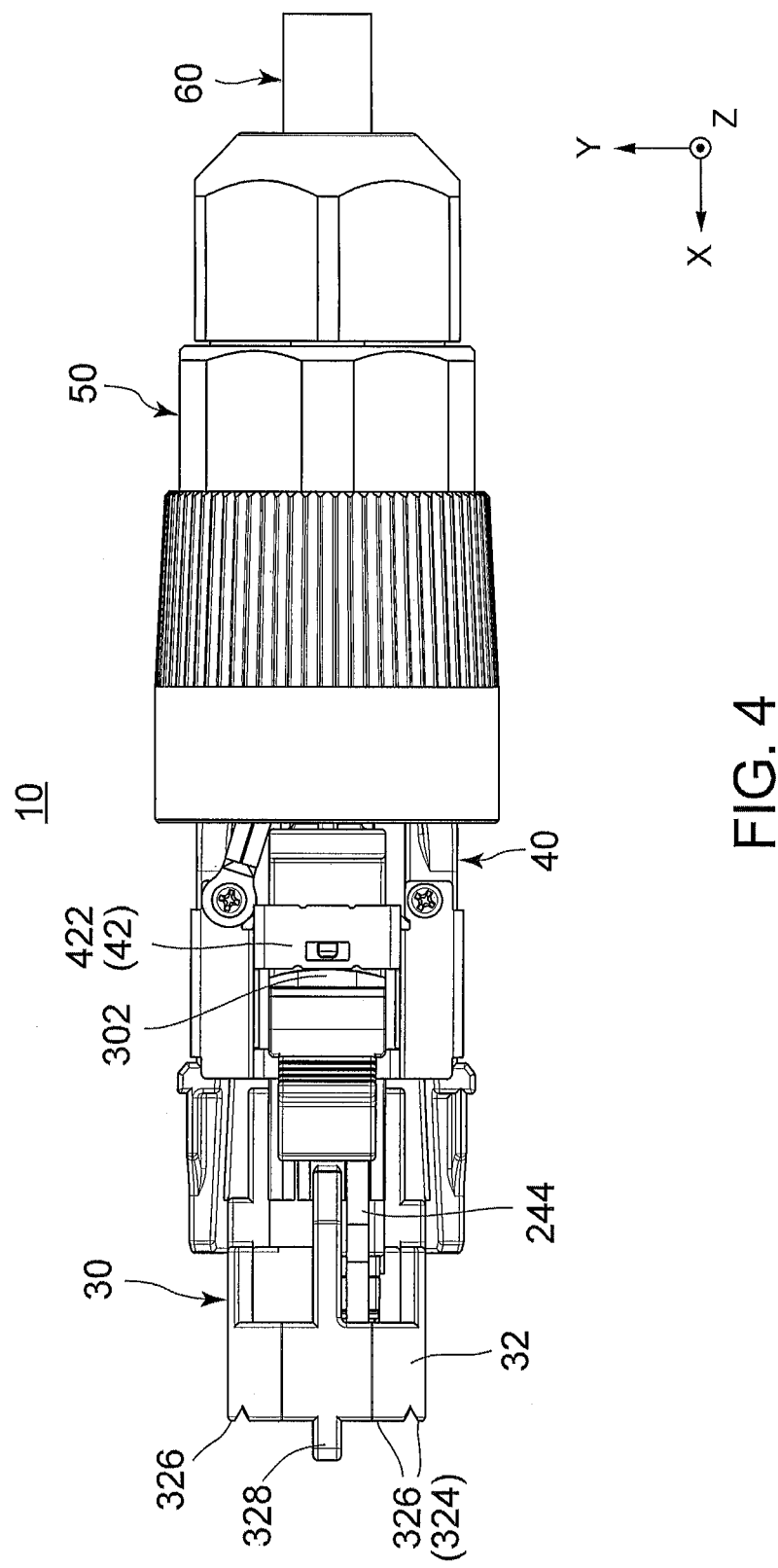
FIG. 4 is a plan view showing the connector of FIG. 1.

Referring to FIG. 6, the barrel 40 supports the guide member 30 relatively movably. In other words, the guide member 30 is floated and supported by the barrel 40. In detail, the guide member 30 is supported by the barrel 40 so as to be relatively movable in a plane perpendicular to the front-rear direction and so as to be relatively movable between a first position and a second position in the front-rear direction. The description about the first position and the second position will be made later. To the barrel 40, a regulating member (a turn regulating member) 42 is fixed to regulate movement of the guide member 30. Between the barrel 40 and the guide member 30, a pressing member 44 is provided. As shown in FIG. 4, the regulating member 42 has a regulating portion 422 of a flat-plate shape that is laid to be perpendicular to the up-down direction. As shown in FIG. 6, the regulating portion 422 is placed above a part of the guide member 30. The guide member 30 has a mating axis along the front-rear direction and can be turned about the mating axis. The regulating portion 422 regulates a turn of the guide member 30 about the mating axis within a predetermined range. The pressing member 44 presses the guide member 30 towards the regulating portion 422. Thus, the guide member 30 receives a force so as to remain a predetermined attitude thereof. As just described, the connector 10 is further provided with the regulating member 42, which regulates the relative movement of the guide member 30 with respect to the barrel 40, and the pressing member 44.

As shown in FIGS. 1, 2, 5 and 6, the barrel 40 also has the preliminary locked portion 402. In the present embodiment, the preliminary locked portion 402 is a protrusion protruding downward. The preliminary locked portion 402 is supported by supporting portion 403 so as to be movable at least in the up-down direction. The preliminary locked portion 402 is locked by the preliminary locking portion 752 of the receptacle 74, when the connector 10 is connected to the structural body 70. Furthermore, on the barrel 40, as shown in FIGS. 6 and 7, a waterproofing member 404 is attached. The waterproofing member 404 is sandwiched between the coupling nut 50 and the receptacle 74 in a state as shown in FIG. 20, i.e. in a state that the coupling nut 50 is fixed to the receptacle 74.

Referring to FIGS. 1 to 7 and 20, the coupling nut 50 is attached to the barrel 40 so as to be relatively movable in the front-rear direction. As understood from FIGS. 6 and 7, the coupling nut 50 has the female screw portion 502 in which a female screw is threaded or formed. The female screw of the female screw portion 502 corresponds to a male screw of the male screw portion 754 of the receptacle 74. The coupling nut 50 is fixed to the receptacle 74 in a state that the preliminary locked portion 402 of the barrel 40 is locked by the preliminary locking portion 752 of the receptacle 74. At this time, the waterproofing member 404 attached to the barrel 40 is sandwiched between the barrel 40 and the coupling nut 50. In the present embodiment, the waterproofing member 404 sandwiched between the barrel 40 and the coupling nut 50 is provided on the barrel 40. However, the waterproofing member 404 may be provided on the coupling nut 50. In other words, the waterproofing member 404 just has to be placed between the barrel 40 and the coupling nut 50.

Figure 5:
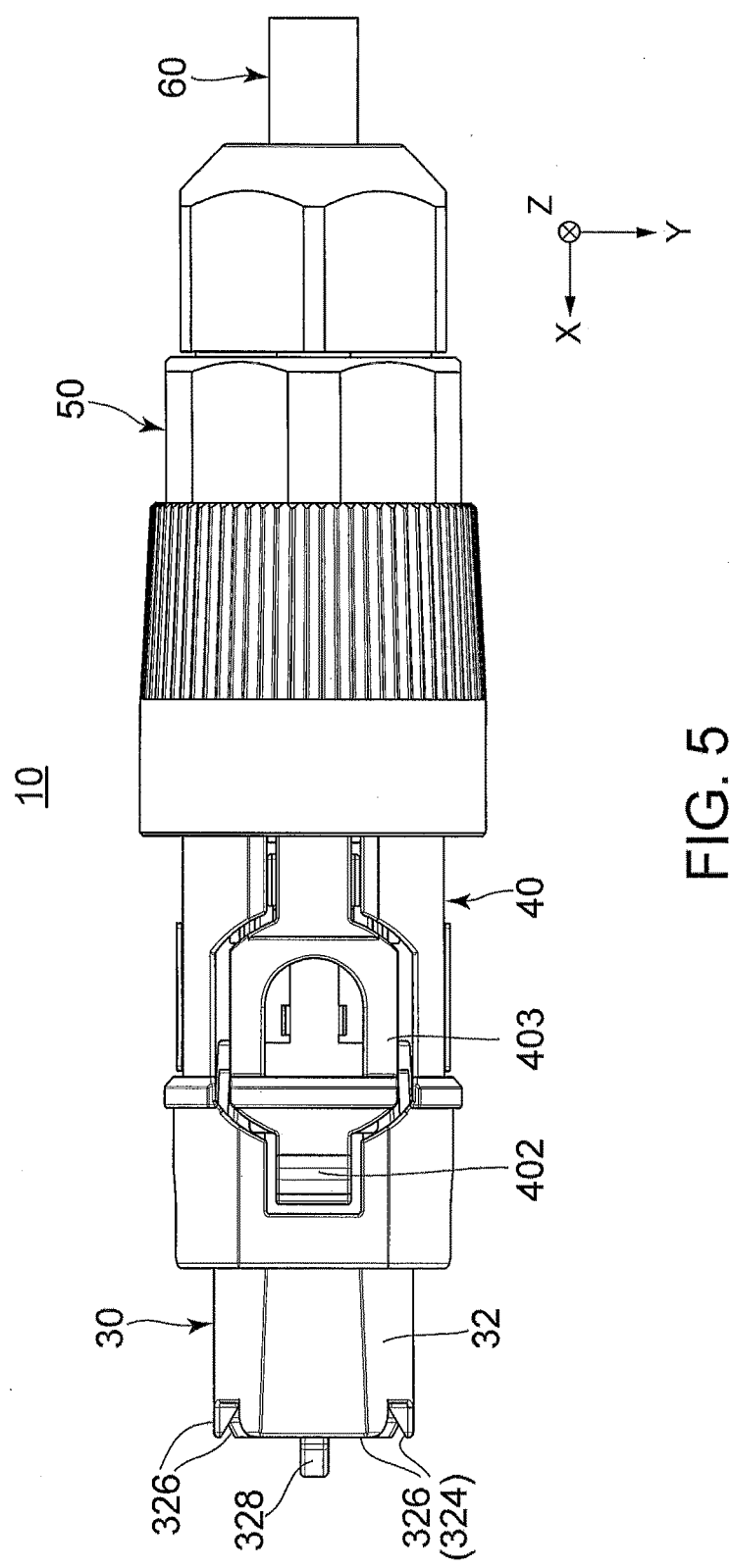
FIG. 5 is a bottom plan view showing the connector of FIG. 1.
Figure 12:
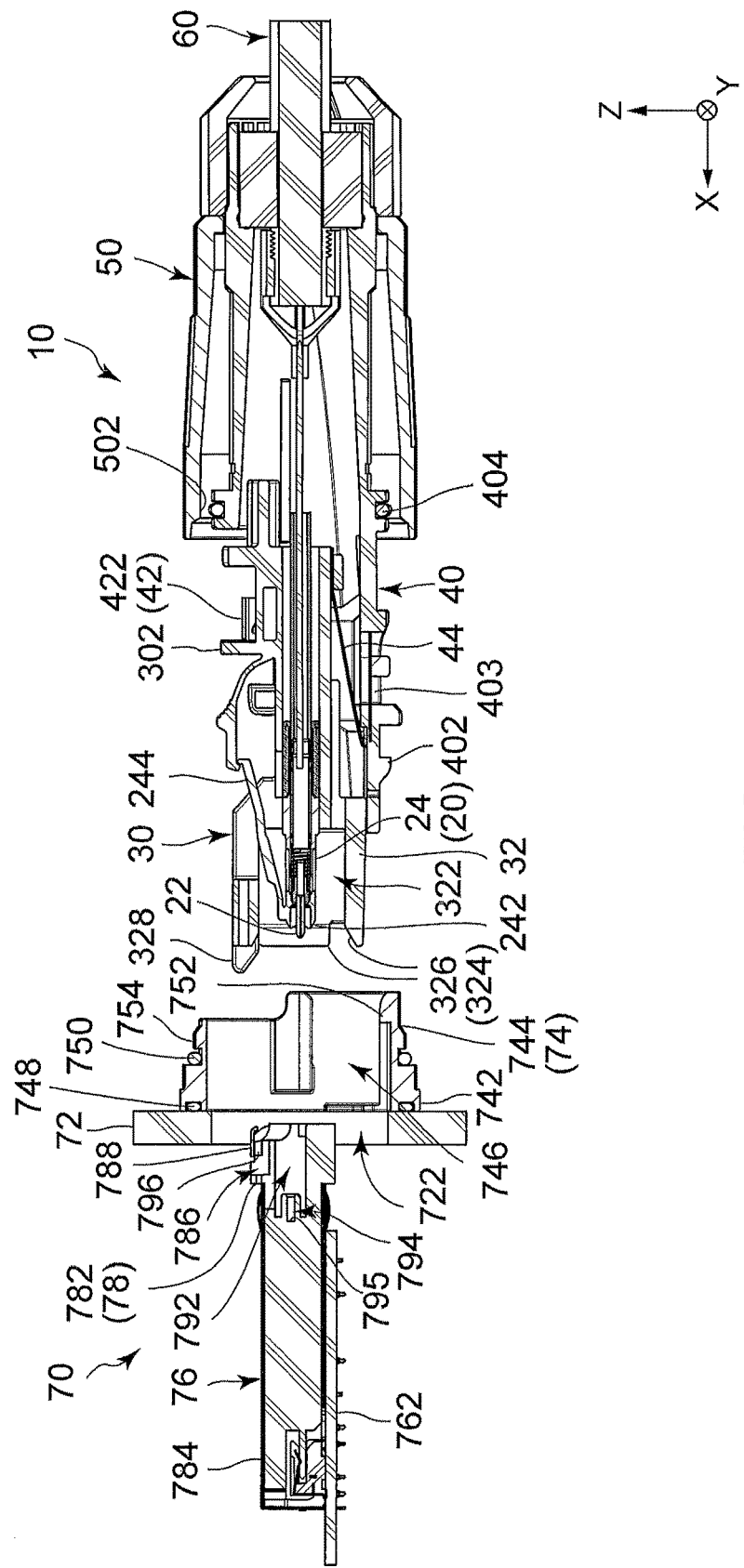
FIG. 12 is a longitudinal cross-sectional view for describing a connecting step of the connector of FIG. 6 and the structural body of FIG. 11. The connector and the structural body are apart from each other.

Next, the description will be directed to connection operation of the connector 10 to the structural body 70. At first, as shown in FIG. 12, the connector 10 is positioned behind the receptacle 74 of the structural body 70. At this time, it is unnecessary to position the connector 10 accurately with respect to the structural body 70. In other words, positioning of the connector 10 with respect to the structural body 70 has only to be roughly performed except for adjusting an orientation of the connector 10 so that the preliminary locking portion 752 shown in FIGS. 10 and 11 and the preliminary locked portion 402 shown in FIGS. 5 and 6 are opposite to each other.

Figure 13:
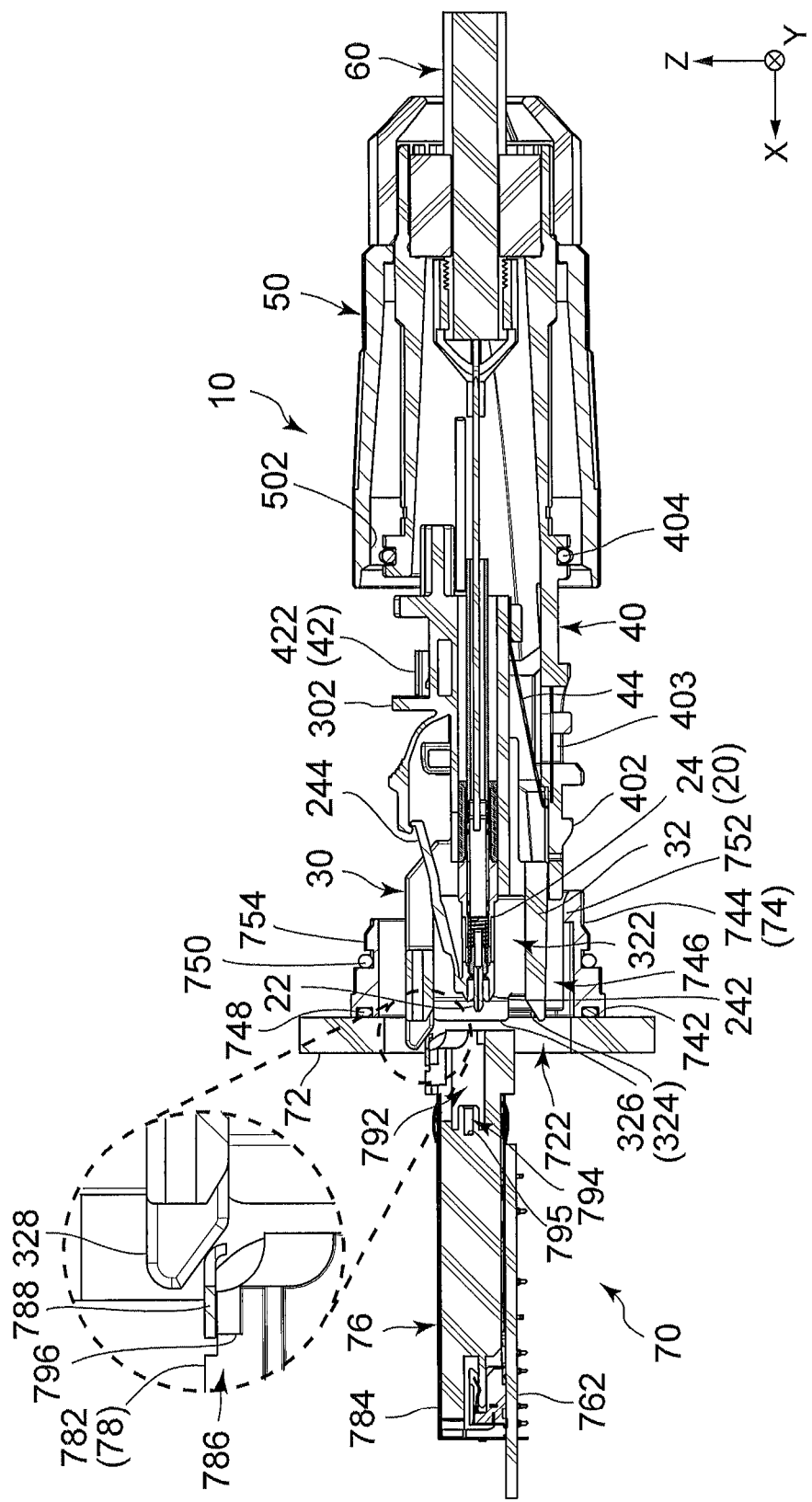
FIG. 13 is a longitudinal cross-sectional view for describing a step succeeding the step of FIG. 12. Before an optical connector reaches an accommodating portion, a first guide portion is brought into contact with an adapter.

Next, as shown in FIG. 13, the connector 10 is moved forward in the front-rear direction to insert the first guide portion 324 of the guide member 30 into the hollow portion 746 of the receptacle 74. When the optical connector 20 and the accommodating portion 792 of the SFP module 782 are not identical to each other in position in a plane perpendicular to the front-rear direction, a part of the first guide portion 324 is brought into contact with a part of the SFP module 782. In the present embodiment, the guide protruding portion 328 is in contact with a reinforcement plate 788, which is a part of the SFP module 782. However, there is a case where a part of the main guide portion 326 instead of the guide protruding portion 328 is brought into contact with a part of the SFP module 782. At any rate, when the first guide portion 324 is brought into contact with the SFP module 782, the guide member 30 receives a force in a direction perpendicular to the front-rear direction. As a result, the guide member 30 is adjusted in position in a plane perpendicular to the front-rear direction. Because the guide member 30 is supported by the barrel 40 so as to be relatively movable, the position adjustment of the guide member 30 is performed even when the barrel 40 is fixed in the plane perpendicular to the front-rear direction. Even in a case where the guide member 30 is fixed to the barrel 40 or a case where the connector does not have the barrel 40, the position adjustment of the guide member 30 can be performed provided that the guide member 30 is movable in the plane perpendicular to the front-rear direction. In this manner, rough positioning of the optical connector 20 with respect to the accommodating portion 792 is performed in the plane perpendicular to the front-rear direction before the optical connector 20 reaches the accommodating portion 792 of the SFP module 782 in the front-rear direction.

Figure 14:
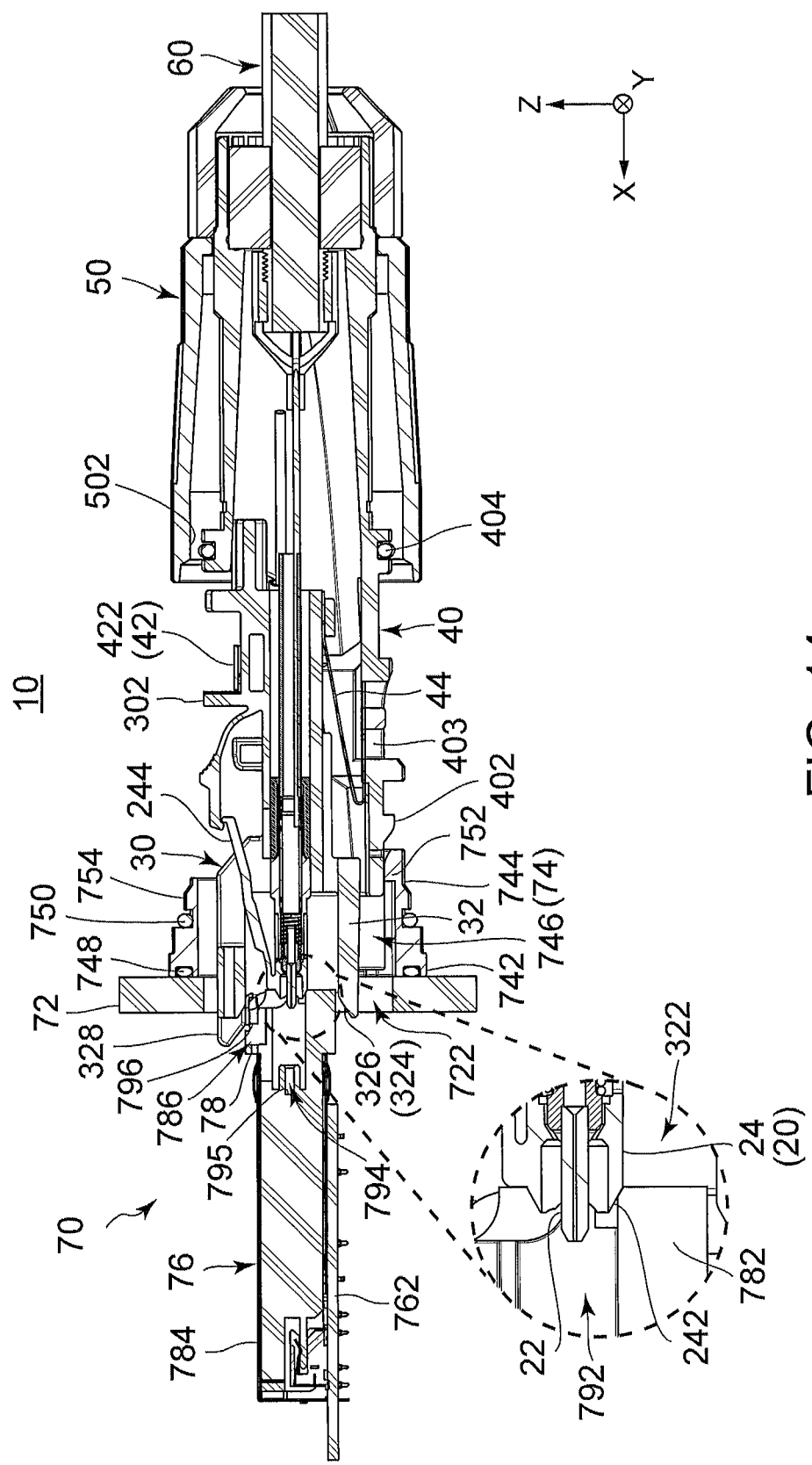
FIG. 14 is a longitudinal cross-sectional view for describing a step succeeding the step of FIG. 13. The optical connector is guided by a second guide portion into the accommodating portion of the adapter.

When the connector. 10 is further moved forward as shown in FIG. 14, the adapter 78 is received by the receiving portion 322 in part. At the same time, the tip portion of the optical connector 20 reaches a rear-end portion of the accommodating portion 792 of the SFP module 782. When the optical connector 20 and the accommodating portion 792 of the SFP module 782 are coincide with each other in position in a plane perpendicular to the front-rear direction, the second guide portion 242 is brought into contact with the SFP module 782 in part. As a result, the optical connector 20 is adjusted in position in the plane perpendicular to the front-rear direction. The position adjustment of the optical connector 20 can be also performed even when the barrel 40 is fixed in position in the plane perpendicular to the front-rear direction. This is because the guide member 30 is supported by the barrel 40 so as to be relatively movable. Even in the case where the guide member 30 is fixed to the barrel 40 or the case where the connector does not have the barrel 40, the position adjustment of the optical connector 20 can be also performed provided that the guide member 30 is movable in the plane perpendicular to the front-rear direction. In this manner, the second guide portion 242 guides the optical connector 20 into the accommodating portion 792 when the connector 10 is connected to the structural body 70. It should be noted that each portion has appropriate dimensions to permit caring out the rough positioning by the first guide portion 324 and the guiding by the second guide portion 242. In detail, the adapter 78 has a first outer shape in a plane perpendicular to the front-rear direction. The receiving portion 322 has a first inner shape in a plane perpendicular to the front-rear direction. The optical connector 20 has a second outer shape in a plane perpendicular to the front-rear direction. The accommodating portion 792 has a second inner shape in a plane perpendicular to the front-rear direction. The first outer shape and the first inner shape define a first difference therebetween. The second outer shape and the second inner shape define a second difference therebetween. The first difference is larger than the second difference.

Figure 15:
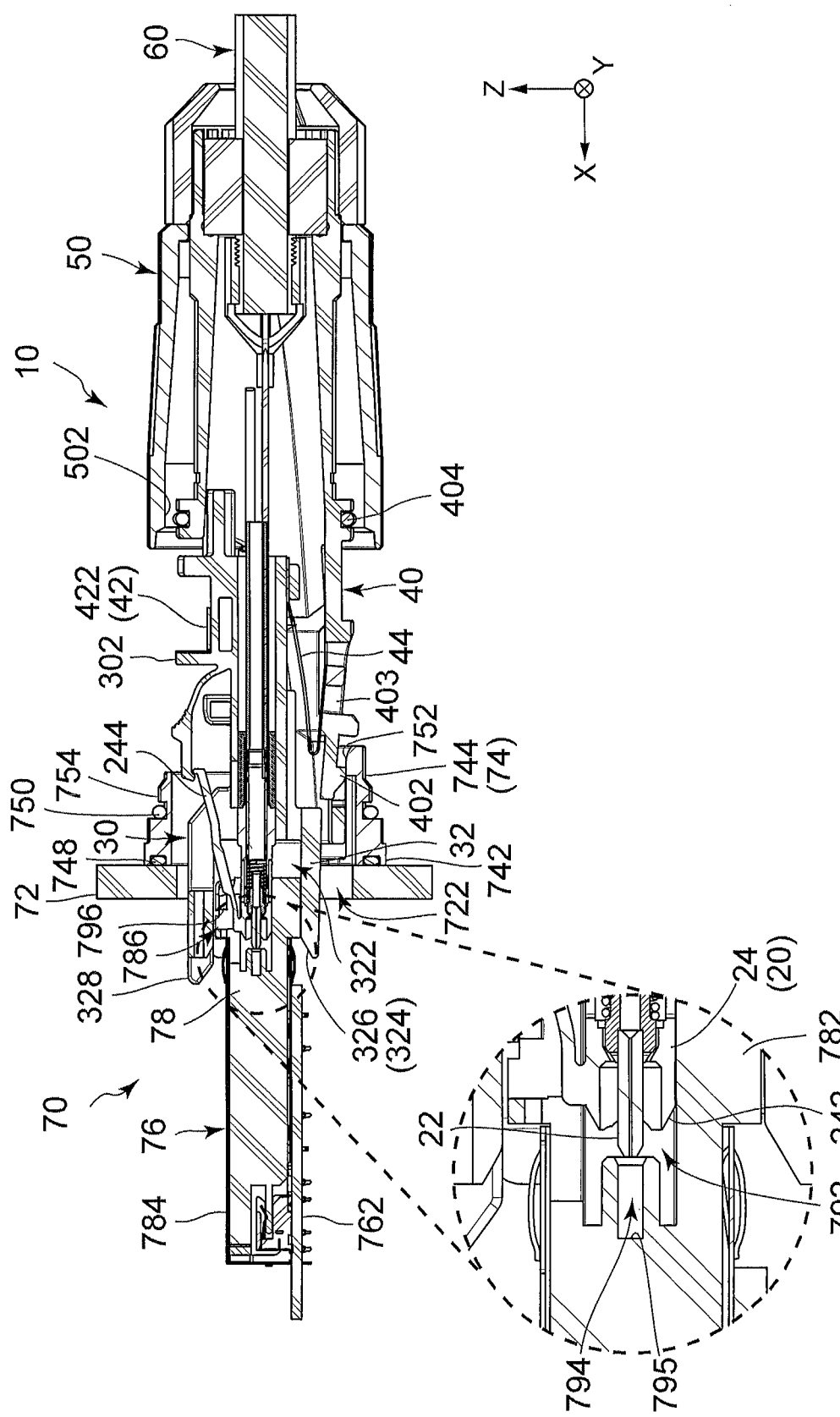
FIG. 15 is a longitudinal cross-sectional view for describing a step succeeding the step of FIG. 14. The optical connector is accommodated in the accommodating portion in part while a tip of a ferrule is not yet received by a sleeve.

Next, as shown in FIG. 15, the connector 10 is further moved forward. Then, the optical connector 20 is accommodated in the accommodating portion 792 at least in part. At the same time, the tip of the ferrule 22 reaches an opening of the sleeve 794. In addition, the preliminary locked portion 402 of the barrel 40 is moved forward to ride over the preliminary locking portion 752 of the receptacle 74.

Figure 16:
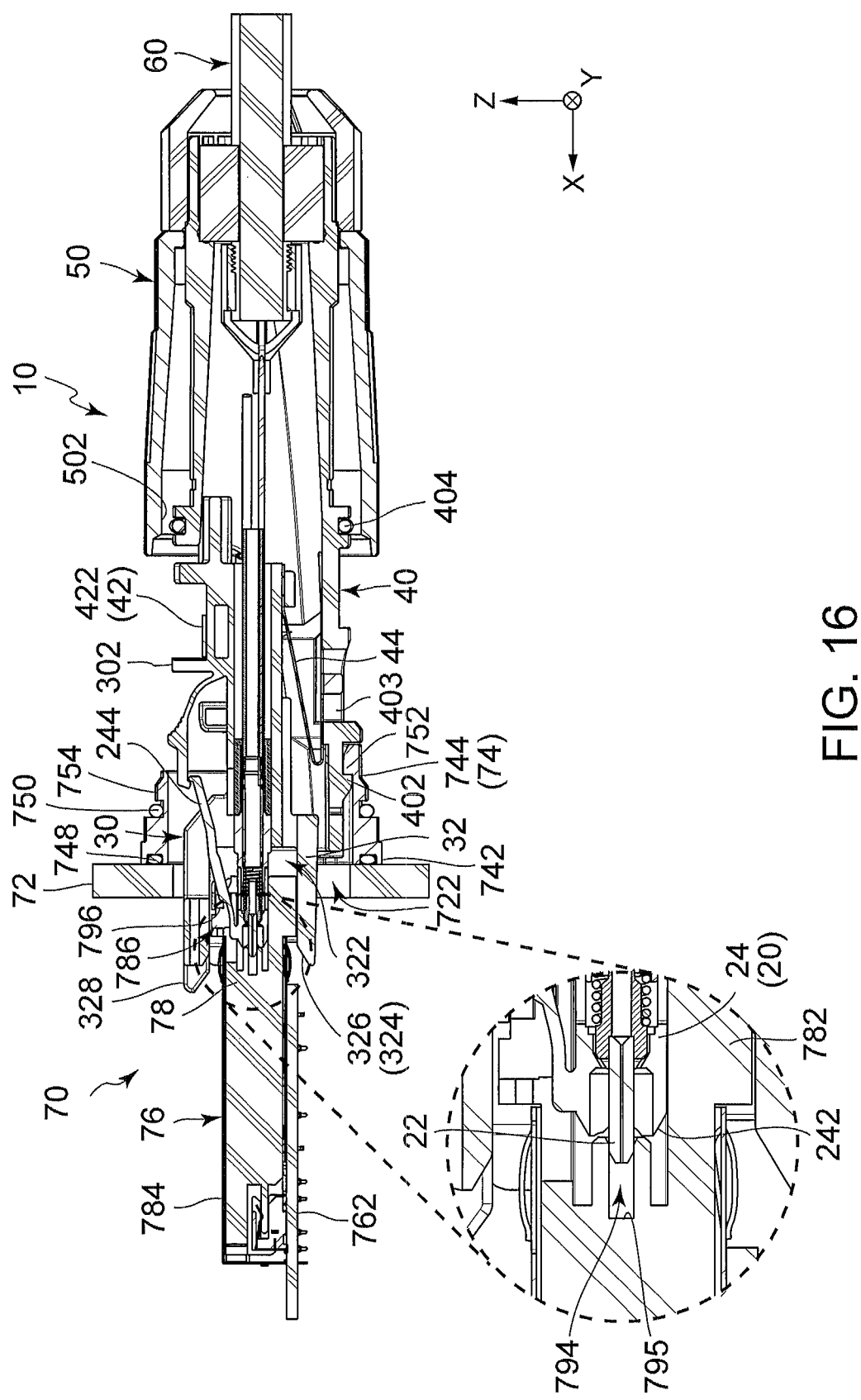
FIG. 16 is a longitudinal cross-sectional view for describing a step succeeding the step of FIG. 15. A preliminary locked portion is locked by a preliminary locking portion. The tip of the ferrule is received by the sleeve.

Next, as shown in FIG. 16, the connector 10 is further moved forward. Then, the tip of the ferrule 22 is received by the sleeve 794 in part. At this time, the guide member 30 is pressed rearward by contact with or friction against the adapter 78 and positioned in the second position which is located rearward beyond the first position in the front-rear direction. Then, the regulating portion 422 regulates the guide member 30 so that the guide member 30 is not moved rearward beyond the second position. In addition, the preliminary locked portion 402 of the barrel 40 is moved forward and rides over the preliminary locking portion 752. As a result, the preliminary locked portion 402 is locked by the preliminary locking portion 752. In this manner, in a state that the guide member 30 is positioned in the second position, the preliminary locked portion 402 is locked by the preliminary locking portion 752. Moreover, when the preliminary locked portion 402 is locked by the preliminary locking portion 752, the tip of the ferrule 22 is received by the sleeve 794. Furthermore, the main locked portions 246 are not yet locked by the main locking portions 796 as shown in FIG. 17. Once the preliminary locked portion 402 is locked by the preliminary locking portion 752, there is no possibility that the connector 10 falls out from the receptacle 74 even when the connector 10 is released from a hand of an operator. Moreover, the tip of the ferrule 22 is received by the sleeve 794 at this time. Accordingly, the operator can freely carry out a following operation without fear of contaminating an end of the optical fiber (not shown) and the front wall (the optical receiving portion) 795.

Next, the protruding portion 302 is moved forward in the front-rear direction as shown in FIG. 18. Then the guide member 30 is moved forward together with the optical connector 20 with respect to the barrel 40 and positioned in the first position. As a result, the tip of the ferrule 22 reaches the front wall (the optical receiving portion) 795 of the sleeve 794. With this, the end of the optical fiber (not shown) fixed to the ferrule 22 is brought into abutment with the optical receiving portion (not shown) of the SFP module 782. Thus, the optical connector 20 and the SFP module 782 are optically connected to each other. Moreover, as shown in FIG. 19, the main locked portions 246 are moved forward and ride over the main locking portions 796. Then the main locked portions 246 are locked by the main locking portions 796. This locking operation is transmitted to the operator as a vibration. The operator can know completion of final connection between optical portions (i.e. the optical fiber and the optical receiving portion). At last, the coupling nut 50 is screwed on the receptacle 74 to finish the connection between the connector 10 and the structural body 70.

As mentioned above, in the connector 10 according to the present embodiment, upon connection of the connector 10 to the structural body 70, the rough positioning of the optical connector 20 by the first guide portion 324 and the guiding of the optical connector 20 by the second guide portion 242 are carried out before the preliminary locked portion 402 is locked by the preliminary locking portion 752. Therefore, the connector 10 of the present embodiment can connect the optical connector 20 to the adapter 78 accuracy without a visual check.

Although the specific explanation about the present invention is made above referring to the embodiments, the present invention is not limited thereto but susceptible of various modifications and alternatives. For example, in the aforementioned embodiment, the guide member 30 is floated and supported by the barrel 40. However, the guide member 30 may be fixed to the barrel 40. In the aforementioned embodiment, both of the preliminary locking portion 752 and the preliminary locked portion 402 are protrusions. However, one of them may be a protrusion while the other may be a recess. Similarly, in the aforementioned embodiment, both pairs of the main locking portions 796 and the main locked portions 246 are formed as protrusions. However, one of the pairs may be formed as protrusions while the other pair may be formed as recesses.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is connectable to a structural body provided with an adapter, wherein:
   the adapter has an accommodating portion and a sleeve located in the accommodating portion;
   the connector comprises an optical connector and a guide member;
   the optical connector is fixed to the guide member;
   the optical connector is accommodated in the accommodating portion at least in part when the connector is connected to the structural body;
   the guide member is provided with a first guide portion and a receiving portion;
   the receiving portion receives the adapter at least in part when the connector is connected to the structural body;
   the optical connector comprises a ferrule and a holding member which holds the ferrule movably along a mating direction;
   the holding member is provided with a second guide portion at a tip portion thereof in the mating direction;
   the second guide portion has a surface intersecting with the mating direction;
   the ferrule protrudes from the holding member in the mating direction;
   the ferrule has a tip which is located between the first guide portion and the second guide portion in the mating direction;
   when the connector is connected to the structural body and before the optical connector reaches the accommodating portion, the first guide portion performs rough positioning of the optical connector with respect to the accommodating portion in a plane perpendicular to the mating direction;
   when the connector is connected to the structural body, the second guide portion guides the optical connector into the accommodating portion; and
   when the connector is connected to the structural body, the tip of the ferrule is received by the sleeve.

2. The connector as recited in claim 1, wherein:
   the adapter has a first outer shape in a plane perpendicular to the mating direction;
   the receiving portion has a first inner shape in a plane perpendicular to the mating direction;
   the optical connector has a second outer shape in a plane perpendicular to the mating direction;
   the accommodating portion has a second inner shape in a plane perpendicular to the mating direction;
   the first outer shape and the first inner shape define a first difference therebetween;
   the second outer shape and the second inner shape define a second difference therebetween; and
   the first difference is larger than the second difference.

3. The connector as recited in claim 1, wherein:
the structural body comprises a receptacle having a preliminary locking portion;
the connector comprises a barrel having a preliminary locked portion;
when the connector is connected to the structural body, the preliminary locked portion of the barrel is locked by the preliminary locking portion of the receptacle;
the guide member is supported by the barrel so as to be relatively movable in a plane perpendicular to the mating direction and so as to be relatively movable between a first position and a second position in the mating direction;
when the connector is connected to the structural body, the preliminary locked portion is locked by the preliminary locking portion in a state that the guide member is positioned in the second position; and
when the preliminary locked portion is locked by the preliminary locking portion, the tip of the ferrule is received by the sleeve.

4. The connector as claimed in claim 3, wherein upon connection of the connector to the structural body, rough positioning of the optical connector by the first guide portion and guiding of the optical connector by the second guide portion are carried out before the preliminary locked portion is locked by preliminary locking portion.

5. The connector as claimed in claim 3, wherein:
the guide member has a mating axis along the mating direction;
the connector further comprises a turn regulating member which regulates a turn of the guide member around the mating axis within a predetermined range;
the turn regulating member has a regulating portion of a flat-plate shape; and the regulating portion is fixed to the barrel.

6. The connector as claimed in claim 5, further comprising a pressing member which presses the guide member toward the regulating portion.

7. The connector as claimed in claim 3, wherein:
the receptacle is formed with a thread; and
the connector further comprises a coupling nut which is fixed to the receptacle in a state that the preliminary locked portion of the barrel is locked by the preliminary locking portion of the receptacle.

8. The connector as claimed in claim 7, further comprising a waterproofing member placed between the barrel and the coupling nut, wherein
the waterproofing member is sandwiched between the barrel and the coupling nut in a state that the coupling nut is fixed to the receptacle.

9. The connector as claimed in claim 1, wherein:
the holding member of the optical connector is provided with a main locked portion;
the adapter is provided with a main locking portion; and
when the tip of the ferrule is received by the sleeve, the main locked portion is locked by the main locking portion.

10. The connector as claimed in claim 1, wherein:
the optical connector is a local connector; and
the adapter is a small form-factor pluggable module or a fiber optic adapter which corresponds to the local connector.

11. The connector as claimed in claim 1, wherein:
the guide member has a protruding portion which protrudes in a direction intersecting with the mating direction; and
the protruding portion is used to move the guide member along the mating direction.

12. The connector as claimed in claim 1, wherein
the first guide portion has a main guide portion and a guide protruding portion protruding from the main guide portion along the mating direction.

* * * * *